(12) United States Patent
Phipps

(10) Patent No.: US 7,300,539 B2
(45) Date of Patent: *Nov. 27, 2007

(54) TREATMENT OF SOLID CONTAINING MATERIAL DERIVED FROM EFFLUENT

(75) Inventor: Jonathan Stuart Phipps, St Ewe (GB)

(73) Assignee: Imerys Minerals Limited, Cornwall (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/300,913

(22) Filed: Nov. 21, 2002

(65) Prior Publication Data

US 2003/0234088 A1 Dec. 25, 2003
US 2005/0167060 A2 Aug. 4, 2005
US 2006/0005932 A2 Jan. 12, 2006

Related U.S. Application Data

(63) Continuation of application No. 09/996,931, filed on Nov. 30, 2001, now abandoned, which is a continuation of application No. 09/148,685, filed on Sep. 4, 1998, now Pat. No. 6,425,973.

(51) Int. Cl.
*D21B 1/08* (2006.01)

(52) U.S. Cl. ............... 162/4; 162/7; 162/9; 162/29; 162/189; 162/190; 162/DIG. 9; 423/155; 423/158; 423/162; 423/165; 210/928; 110/346

(58) Field of Classification Search ............ 162/4, 162/7, 9, 29, 189, 190, DIG. 9; 423/DIG. 3, 423/155, 158, 162–163, 165; 210/928; 110/346
See application file for complete search history.

(56) References Cited

U.S. PATENT DOCUMENTS

| | | | |
|---|---|---|---|
| 3,320,076 A | 5/1967 | Sutton | |
| 3,765,921 A | 10/1973 | Puskar | |
| 3,876,497 A | 4/1975 | Hoffman | |
| 3,920,506 A | 11/1975 | Morgan | |
| 4,115,188 A * | 9/1978 | O'Brien et al. | 162/190 |
| 5,332,474 A | 7/1994 | Maxham | |
| 5,683,590 A | 11/1997 | Phipps | |
| 5,711,802 A | 1/1998 | Theil | |
| 5,806,444 A * | 9/1998 | Figueras et al. | 110/346 |
| 5,846,378 A | 12/1998 | Phipps | |
| 5,961,941 A | 10/1999 | Klyosov et al. | |
| 6,063,237 A | 5/2000 | Adams et al. | |
| 6,214,166 B1 | 4/2001 | Münchow | |
| 6,425,973 B1 * | 7/2002 | Phipps | 162/4 |
| 6,444,092 B1 | 9/2002 | Münchow | |
| 2004/0129177 A1 | 7/2004 | Cadoret | |

FOREIGN PATENT DOCUMENTS

| | | |
|---|---|---|
| DE | 3838379 A1 | 6/1989 |
| EP | 0 156 576 | 12/1987 |
| EP | 0 369 650 B1 | 5/1990 |
| EP | 0 613 867 B1 | 9/1994 |
| EP | 0 742 310 B1 | 11/1996 |
| EP | 0 789 670 B1 | 8/1997 |
| EP | 0 796 230 B1 | 9/1997 |
| EP | 0 798 268 A1 | 10/1997 |
| EP | 1 454 886 A1 | 9/2004 |
| GB | 1 366 020 | 9/1974 |
| GB | 2 076 308 A | 12/1981 |
| GB | 2315743 * | 2/1998 |
| JP | 4018185 | 1/1992 |
| WO | WO 95/18885 | 7/1995 |
| WO | WO 96/06057 | 2/1996 |
| WO | WO 96/32354 | 10/1996 |
| WO | WO 97/28087 | 8/1997 |
| WO | WO 99/67335 | 12/1999 |

OTHER PUBLICATIONS

Brooks, A. M., Pigments for Paper Coating: Prepared Under the Direction of The Tappi Coating Committee, 1948, p. 17-32, Tappi Monograph Series—No. 7, N.Y., Technical Association of the Pulp and Paper Industry.
Michael W. Ginn, "New Technology Creates Minerals, Pigments From Deinking Residuals," Paper & Pulp, May 2005, pp. 51-57.
Derwent abstract for DE 3838379, published on Jun. 8, 1989.
Derwent abstract for JP 4018185, published on Jan. 22, 1992.
Esp@cenet Translation of WO 97/28087, published on Aug. 7, 1997.

* cited by examiner

*Primary Examiner*—Mark Halpern
(74) *Attorney, Agent, or Firm*—Finnegan, Henderson, Farabow, Garrett & Dunner, L.L.P.

(57) ABSTRACT

A method of treating solid containing material derived from effluent or sludge from a plant for deinking paper, the material containing calcium in the form of one or more insoluble calcium compounds, the method including the steps of treating the material with an acid to cause dissolution of the calcium thereby forming a calcium ion-containing solution in which insoluble solids are suspended, separating the solution from the insoluble solids and incinerating the separated solids. The solution containing calcium ions may be treated by adding one or more reagents to form a calcium compound precipitate, eg calcium carbonate. The particulate solids produced following the incineration step and following the precipitate formation may be employed as pigments or fillers in paper making or paper coating.

45 Claims, 2 Drawing Sheets

US 7,300,539 B2

TREATMENT OF SOLID CONTAINING MATERIAL DERIVED FROM EFFLUENT

This is a continuation of application Ser. No. 09/996,931, filed Nov. 30, 2001, now abandoned, which is a continuation of application Ser. No. 09/148,685, filed Sep. 4, 1998, and Continued Prosecution Application (CPA) filed Nov. 22, 2000, which issued as U.S. Pat. No. 6,425,973 on Jul. 30, 2002, which are each incorporated herein by reference.

BACKGROUND OF THE INVENTION

1. Field of the Invention

The present invention relates to the treatment of solid containing material derived from effluent, especially to recover useful materials therefrom.

In particular, this invention is concerned with a method for recovering useful materials from what has hitherto been regarded as the waste material produced by an industrial plant for treating paper, especially for de-inking waste paper.

Paper and paperboard products are generally made by preparing a dilute aqueous suspension containing cellulosic fibres derived from wood or from some other suitable fibrous material, and de-watering the suspension on a moving wire mesh belt to form a sheet material. The suspension may also contain a proportion of a mineral filler material which improves the brightness and opacity of the finished paper or board. Natural cellulosic fibrous materials are generally expensive, and the trees or other plants from which they are obtained must be replaced if the balance of the environment is not to be disturbed. It is therefore desirable to incorporate in the aqueous suspension from which the sheet material is made a substantial proportion of cellulosic fibrous material which has been recovered from waste paper. Most waste paper which is recycled has been printed on at least one of its surfaces, and it is necessary to separate the printing ink residue from the cellulosic fibres if the recovered material is to be suitable for use as a starting material in a paper making process. If the ink is not separated, the fibrous material will generally be unacceptably dark in colour. Generally, printing ink contains elemental carbon (carbon black) and other dark material which causes the dark coloration.

Commercially operated processes for de-inking waste paper generally comprise a pulping stage in which the waste paper is subjected to mechanical agitation in water which also contains sodium hydroxide which causes the fibres to swell, and which breaks down most ink vehicles by saponification or hydrolysis, sodium silicate which acts as a pH buffer and agglomerates detached ink particles to a convenient size, and a surfactant which wets the ink particles and helps to keep them in suspension. The suspension formed in the pulper is passed through a primary screening system in which heavy foreign bodies, such as staples, paper clips and pieces of grit are removed. The suspension passing through the screens is then fed to a treatment plant comprising one or more froth flotation cells, or one or more washing units, or a combination of washing units and flotation cells. The froth flotation cells are each provided near the bottom with a rotating impeller and means for admitting air under pressure in the form of fine bubbles in the region of the impeller. It may also be advantageous to add to the suspension, before it enters the flotation cell, a reagent known as a collector which attaches itself preferentially to the ink particles and increases their affinity with air relative to that with water. As a result, the ink particles are preferentially lifted by the air bubbles to the surface of the suspension in the flotation cell, where they are discharged in a froth product.

In the washing units the pulp is subjected to agitation in fresh or recycled water, optionally containing a dispersing agent, and the washed pulp is then drained on a screen of aperture size such as to retain the relatively long cellulosic fibres, while allowing to pass the mineral and organic particles and the fine fibre fragments.

The suspension which is discharged from the bottom of the flotation cell, and/or the suspension which passes the screens of the washing steps, is de-watered and the de-watered material, which consists of substantially de-inked cellulosic fibre material, may be subjected to further purification steps before being finally de-watered and dried for re-use in a sheet forming process.

The de-inking treatment plant reject consists of an aqueous effluent or sludge which is produced in large volumes. The reject from some plants is discarded and transferred to a waste disposal site, eg a landfill site. The reject from other plants is incinerated and this beneficially reduces the volume of the reject and generates useful heat energy from the combustion of organic components. The ash from the incineration is subsequently disposed of. However, in both cases, there is an undesirable cost and environmental impact associated with disposal. Also, potentially useful materials are wasted by the disposal process. The de-inking treatment plant, reject generally contains, in addition to the ink particles and various additives employed in paper, a substantial proportion of the inorganic filler particles which were originally present in the waste paper. These filler particles usually consist predominantly of a mixture of kaolin clay and calcium carbonate in various proportions, although other inorganic filler particles such as silicates, talc, calcium sulphate or titanium dioxide may also be present in minor proportions.

2. Related Prior Art

In the prior art, various patent specifications have been published which describe processes for incinerating waste solids from de-inking sludge. In some of these processes the ash produced following incineration is further treated to render the particulate material contained in the ash suitable for re-use in a paper making process. Examples of specifications describing such processes include WO96/32354. Where the sludge solids treated include calcium carbonate this can react with kaolin present to produce a glassy composite phase which causes the particulate product to be abrasive. As described in EP798268-A1, the incineration temperature may be controlled so as to minimise formation of the glassy phase, but this procedure can be relatively complicated and expensive to operate and may cause the resulting particulate product to have inferior optical properties, eg a reduced brightness.

SUMMARY OF THE INVENTION

The present invention allows treatment of calcium compound-containing solids obtained from a waste paper de-inking sludge to be carried out in a manner which does not suffer from the problems of the prior published processes referred to earlier and allows improved products suitable for re-use as pigments and fillers, eg for addition to papermaking compositions, to be obtained in a simpler and cheaper manner.

According to the present invention there is provided a method of treating solid containing material derived from effluent or sludge from a plant for de-inking paper, the material containing calcium in the form of one or more insoluble calcium compounds, the method including the steps of treating the material to cause dissolution of the calcium thereby forming a calcium ion-containing solution in which insoluble solids are suspended, separating the solution from the insoluble solids and incinerating the insoluble solids.

The treated solid containing material may comprise the said effluent or sludge, optionally after diluting with water, and may comprise the particulate materials described hereinbefore. The said calcium compound may comprise calcium carbonate and/or calcium sulfate and/or calcium silicate, and/or calcium phosphate.

The method of the invention may surprisingly and beneficially be operated in a less costly manner than that described in EP798268-A1, because it does not require use of the close temperature control (which requires use of expensive automation equipment), multiple calcination steps and recarbonation (following aqueous dispersion) of the resulting ash all as required in the process of EP798268-A1. As illustrated later, the product of the method of the invention, even though produced by a less complicated and less costly process, shows properties relevant to re-use, eg in a paper making process, comparable with those obtained for the product of the process of EP798268-A1.

DESCRIPTION OF THE INVENTION

The said treatment to cause dissolution of the calcium comprises addition of an acid which may be a dilute acid. The dilute acid used may comprise any one or more of the dilute acids known to form soluble calcium salts. Mineral acids such as hydrochloric acid are preferred. Some dilute acids, eg sulfuric acid, which may be employed will cause the calcium ions released to form a partially soluble salt, eg calcium sulfate. In this case, the partially soluble salt will remain in the subsequently separated and calcined solids.

In the method according to the present invention the calcium dissolution step may be carried out with the assistance of heating and other suitable agents, eg mechanical agitation or stirring.

After calcium has been dissolved over a sufficient period of time, which will depend upon the amount of calcium to be dissolved, the calcium ion-containing solution will generally have suspended therein particulate solid material whose content will depend on the composition of the original de-inking effluent or sludge and any treatment which has been applied to it. The solid particulate material may be separated from the calcium ion-containing solution by one or more suitable known separation techniques, eg filtration, evaporation or by use of a hydrocyclone or a centrifuge, applied in one or more stages.

The solid material remaining after the acid dissolution step may be treated, optionally after a drying step, by one or more heat treatment steps which provide incineration of the combustible organic compounds present and calcining of the remaining particulate material which is likely to comprise principally kaolin.

The heating step applied to calcine the kaolin-containing particulate material may be carried out at a temperature higher than that employed in the examples described in EP798268-A1. For example, a single incineration and calcination step may be applied in a known incineration device, eg a fluidised bed furnace, at a temperature of between 900° C. and 1200° C., desirably from 950° C. to 1050° C. Carbon present from the ink contained in the de-inking sludge is oxidised quickly at this temperature.

The resulting particulate material following incineration and calcination may be further treated, either in a dry form or in the form of an aqueous suspension, to improve the properties of the particulate material, eg by comminution such as attrition or media grinding in a known manner, particle size classification (if not previously applied), washing, addition of chemical agents, eg optical brightening agents, coagulants etc. The resulting particulate product may be delivered in dry or aqueous slurry form to a paper mill for use in a paper making or paper coating process in a known manner optionally together with other known pigments, eg kaolin, calcined kaolin, calcium carbonate, talc, titanium dioxide, talc or calcium sulfate.

Where the recovered product is recycled for re-use in a paper mill, the paper mill may be associated with the de-inking plant from which the treated sludge has been obtained.

Where the recovered product is recycled for re-use in a paper mill it may be used as a paper making filler in the mill in a known manner. This filler, optionally mixed with other fillers as described earlier, may be employed as a dilute slurry by mixture with a dilute cellulose fiber slurry to produce a paper making furnish. The solids of the furnish composition may for example constitute from 0.2% to 2%, eg from about 0.5% to 1% by weight of an aqueous suspension.

After the solid material has been separated the calcium ion-containing solution may be treated to form a precipitate of useful insoluble calcium compound. An alkali metal salt, eg a sodium salt, may be added to the solution to provide the required anion. For example, sodium carbonate may be added to the calcium ion-containing solution to produce a calcium carbonate precipitate. Where the calcium ion-containing solution comprises calcium chloride, sodium chloride is left in solution.

Alternatively, an alkali metal hydroxide, eg sodium hydroxide, may be added to release calcium hydroxide.

Where the calcium ion-containing solution contains calcium hydroxide, formed for example by addition of an alkali metal hydroxide to a calcium salt solution, carbon dioxide may conveniently be added to the calcium hydroxide solution to form a calcium carbonate precipitate. Formation of precipitated calcium carbonate by addition of carbon dioxide to calcium hydroxide is, of course, well known in the pigment producing art.

The insoluble calcium compound product thereby formed, eg calcium carbonate, may be separated from the aqueous medium in which it is formed by a suitable separation process, eg filtration, evaporation or by use of a hydrocyclone or a centrifuge. The product may be stored and thereafter supplied for use in one of the applications described hereinafter, especially as a particulate filler in the manufacture or coating of paper. Where the solution contains little dissolved material after formation of the calcium compound precipitate, eg after calcium hydroxide has been converted to calcium carbonate using carbon dioxide, the suspension or slurry containing the precipitate may itself be used optionally with partial dewatering.

For example, the suspension may be delivered to a paper mill for use of the suspension as a particulate filler supply for use in paper manufacture or one of the other pigment or filler applications described for the calcined kaolin-containing material described earlier. The method of use may be as for that material.

If the solution in which the insoluble calcium precipitate is produced contains dissolved species these may optionally be recovered and re-used. For example, where the dissolved species comprises sodium chloride solution this may be electrolysed in a known way to produce sodium hydroxide plus hydrogen and chlorine gases. The gases may be recombined to produce hydrogen chloride from which: hydrochloric acid can be recovered which can be re-cycled for re-use in the acid dissolution step. The sodium hydroxide can be recycled for re-use as the alkali metal hydroxide for addition to the calcium ion-containing solution. In addition, carbon dioxide is produced in the dissolution step this may be re-cycled for re-use in the precipitation step. In this way, the need to purchase chemical reagents and to dispose of by-products can be minimised or avoided.

The method according to the present invention beneficially allows minimization of the amount of solid waste from a de-inking plant thereby reducing or eliminating the cost and environmental impact of disposal of such waste. Furthermore, the method allows one or more useful products to be recovered in a manner which is simpler and cheaper than the relevant prior art.

The useful product recovered includes a calcined kaolin-containing particulate material which does not suffer substantially from the abrasiveness normally caused by incinerating kaolin and calcium carbonate together. In this case, the calcined kaolin composition may be used in various pigment employing applications, eg paper making as described earlier or in paper coating, filling of polymers, paints and the like. Such a product may show improved optical properties, eg brightness, compared with products produced by incineration of solids from de-inking sludge by prior published methods without discoloration from ink coloring materials, eg carbon, and in a cheaper manner.

A further product, for example calcium carbonate, may also be recovered without the dark coloration normally associated with de-inking reject and is suitable for use in the various applications in which precipitated calcium compounds, eg calcium carbonate, are known to be useful, eg as a particulate filler or extender material in paper, polymers, paints and the like or as a coating pigment or colour ingredient for coating of paper, paper board, plastic papers and the like.

Other particulate materials, eg-silicate and aluminosilicate material contained in the de-inking reject may, as described hereinbefore, be converted after calcination into useful products, eg pozzolans, and the reagents used in the method according to the present invention may be recycled thereby minimizing reagent costs and waste disposal.

DESCRIPTION OF ILLUSTRATIVE EMBODIMENTS

Embodiments of the present invention will now be described by way of example with reference to the accompanying drawings.

Figure 1:
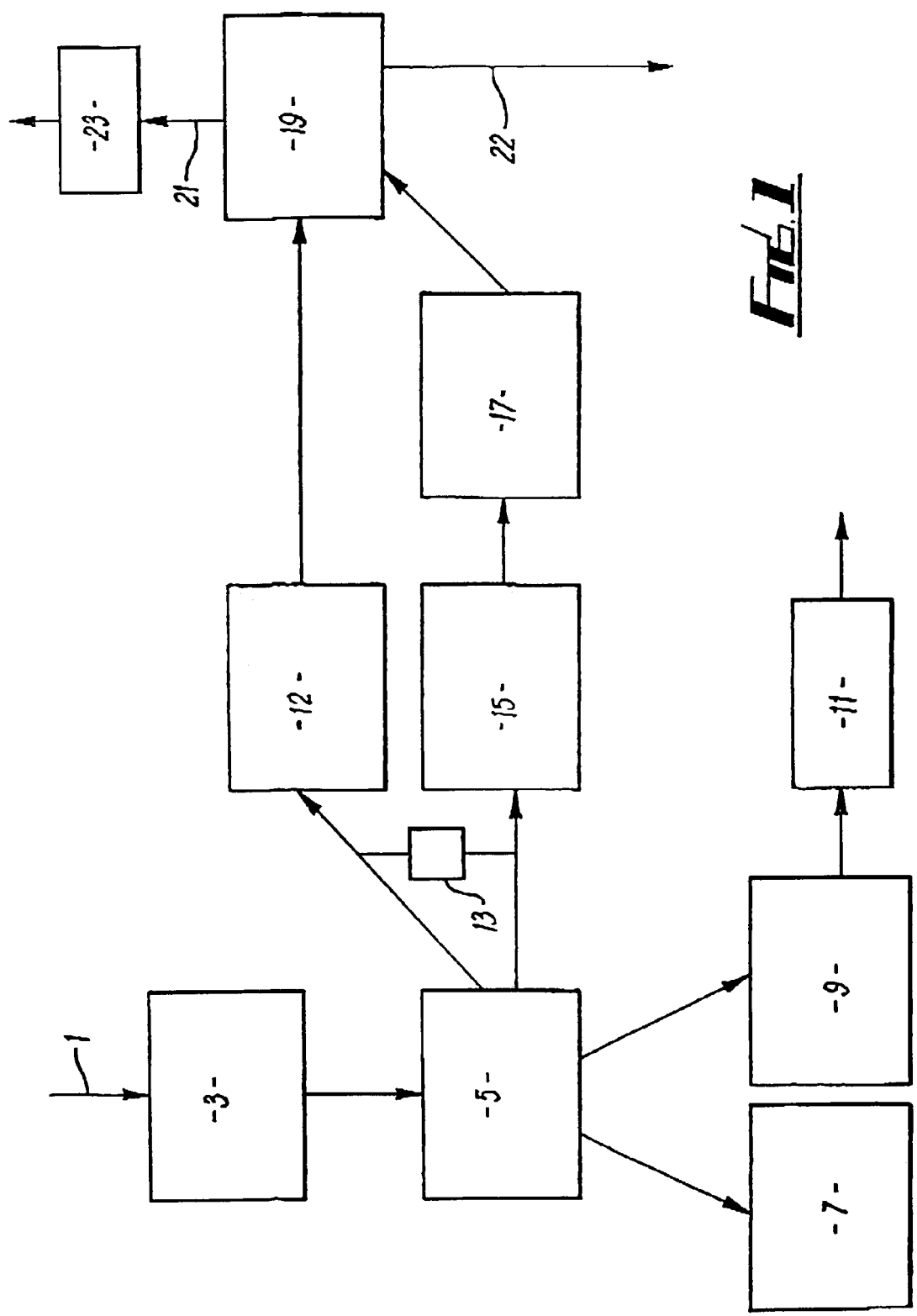
FIGS. 1 and 2 are schematic flow diagrams of alternative methods embodying the invention.

As shown in FIG. 1, in a first example of a method embodying the invention, input solid-containing material 1, preferably in the form of an aqueous suspension, comprises, reject sludge from a paper de-inking plant (not shown).

The material 1 is subject to an acid dissolution step in a vessel 3 in which calcium present in the input material is dissolved as a soluble salt, eg calcium chloride, by use of dilute hydrochloric acid. The suspension formed by the acid dissolution step is subject to a solid/liquid separation step in a separator 5. Solids obtained by the separation step in the separator 5 is delivered to an incinerator 9, eg operated at a temperature of 800° C. to 1200° C. as appropriate, which oxidises the combustible organic material and carbon present in the solids and produces an inorganic product 11 comprising predominantly calcined kaolin (metakaolin). The product 11 optionally with further treatment, eg comminution, particle size classification and washing, may be delivered in dry or slurry form for use as a filler in paper making in the manner described earlier.

The solution separated by the liquid/solid separation step in the separator 5 may be delivered to a vessel 12 in which sodium carbonate is added in a quantity calculated to give a required amount of precipitated calcium carbonate according to the amount of calcium present. The solution entering the vessel 12 may be monitored on-line by a monitor 13 to determine its calcium ion concentration and hence the required concentration of sodium carbonate in the vessel 12. The solution separated by the liquid/solid separation in the separator 5 may alternatively be delivered to a vessel 15 via a line also monitored by a monitor 13 in which sodium hydroxide solution is added to the solution to form calcium hydroxide which will dissolve in the water present up to its limiting solubility. Carbon dioxide is added in a reactor 17 (which may be the same as the vessel 15 or a separate reactor). The required amount of carbon dioxide to be added may, as an indication, be calculated from the amount of calcium hydroxide present which in turn can be determined from the concentration of calcium ions monitored by the monitor 13. It is not essential to calculate the required amount of carbon dioxide since after all calcium hydroxide has been consumed the pH of the solution will drop indicating that the reaction has terminated.

The precipitate-containing slurry formed either in the vessel 11 or in the reactor 17 is subjected to dewatering, eg by evaporation, in a concentrator 19. Output material 21 in slurry or dry powder form, as appropriate, from the concentrator 19 is delivered to a storage tank 23 for onward supply to a user plant, eg a paper making mill or plant in which the material 21 is to be used as a paper filler material in the manner described earlier.

Liquid 22 separated by the concentrator 19 may be discharged as effluent or may be treated to recover reagents therefrom. For example, where the liquid 22 comprises predominantly sodium chloride solution, this may be electrolysed to produce hydrogen and chlorine and to leave sodium hydroxide. The hydrogen and chlorine may be combined to produce HCl for re-use in the acid dissolution step in the vessel 3 leaving, from the electrolysis, sodium hydroxide in the vessel 15 which may be re-used.

Figure 2:
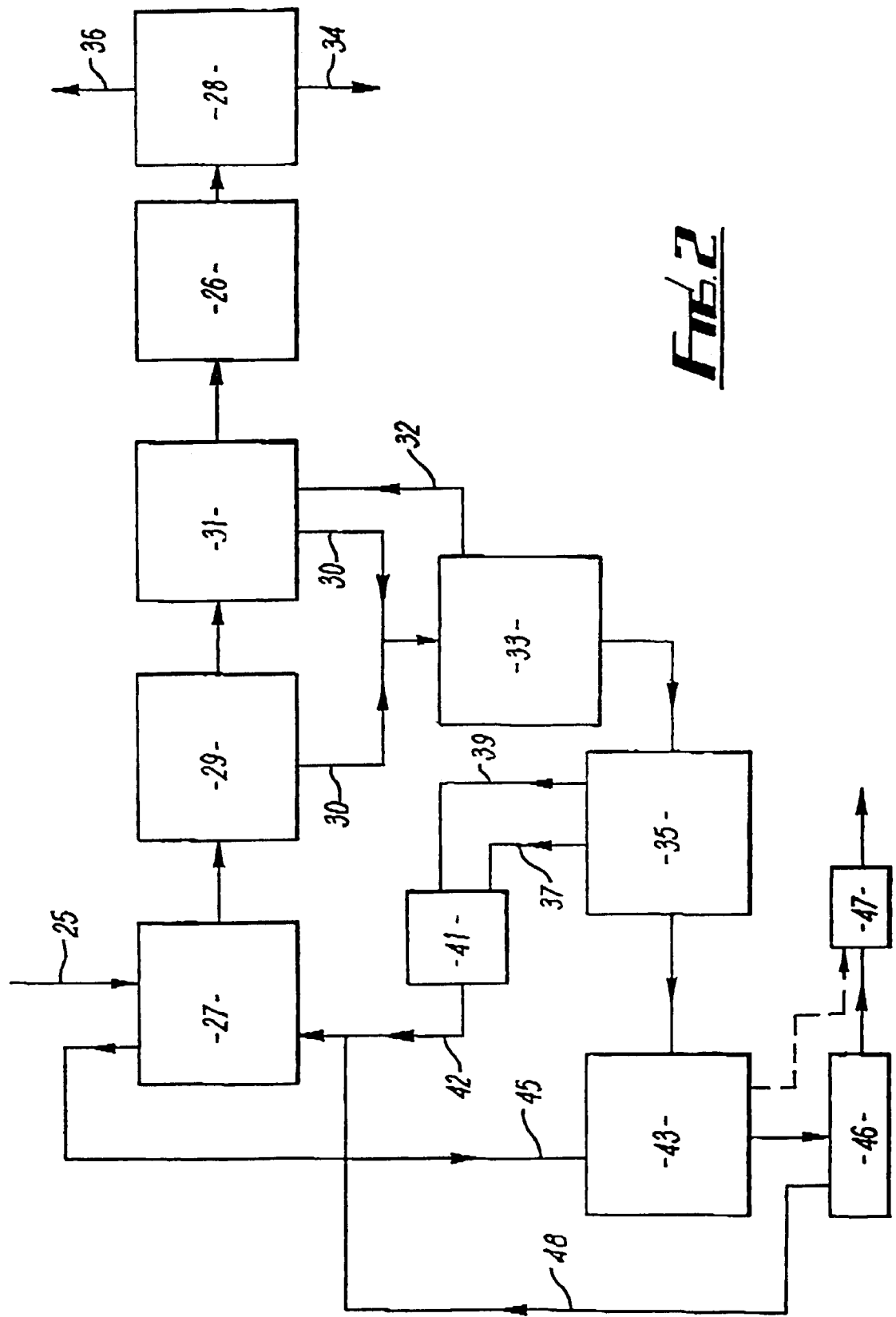

An alternative method embodying the present invention is illustrated in FIG. 2. In this case, input material 25 comprises de-inking plant effluent sludge preferably diluted with clean water. This material 25 is delivered to an acid tolerant vessel 27 in which dilute hydrochloric acid is added. The suspension remaining in the vessel 27 is subjected to liquid/ solid separation in a separator 29. The solid separated may be washed in a washer unit 31 and thereafter dried in a dryer 26 and incinerated in a fluid bed incinerator 28 operating at a temperature of about 1000° C. Heat energy 36 is generated by the combustion of organic material in the incinerator 28. Carbon is oxidized in the incinerator. The solids output or ash from the incinerator 28 indicated by output 34 comprises predominantly calcined clay (metakaolin). This product may be used as a pigment or filler as described earlier, eg by re-use in paper making.

The solution indicated as 30 separated by the separator 29 and/or by the washer unit 31 is delivered to a concentrator 33. Extracted water 32 may be re-used in the washing unit 31. The solution concentrated by the concentrator 33 comprising mainly calcium chloride is delivered to an electrolytic cell 35. Hydrogen 37 and chlorine 39 are produced by the cell 35 and are delivered to a reactor 41 in which they are reacted to form hydrogen chloride gas 42. The HCl gas 42 may be recycled after dilution as dilute hydrochloric acid for addition in the vessel 27.

A calcium hydroxide-containing slurry formed by electrolysis of calcium chloride in the cell 35 is delivered to a reactor 43, in a metered amount, and an appropriate amount of carbon dioxide 45 which may be obtained as a by-product from the acid dissolution in the vessel 27 is supplied to the reactor 43 to provide conversion of the calcium hydroxide present to precipitated calcium carbonate. The product slurry formed may be concentrated by dewatering in a concentrator 46 and delivered to a storage tank 47 for onward delivery as a product, eg as a particulate filler in paper manufacture. Alternatively, the product slurry formed in the reactor 43 may be delivered via the storage tank 47 for use without dewatering. Water 46 obtained from the dewatering process in the concentrator 46 may be recycled for dilution of the HCl output 42.

EXAMPLE

A deinking sludge having a calcium carbonate content of about 5% by weight and a kaolin content of about 40% by weight, based on the dry solids weight of the sludge, was treated in the manner described with reference to FIG. 1 by addition of dilute hydrochloric acid to dissolve the calcium carbonate present followed by incineration and calcination in a furnace at a temperature of about 1000° C. for several hours overnight. The product obtained was redispersed in water and milled by sandgrinding and then subjected to the tests described later in this Example. The Product is there referred to as 'Product 2'. For comparison purposes, a further product, Product 1, was made without acid dissolution by the more complicated and costly method described in EP798268 using carefully controlled incineration and calcination at a temperature of 750° C.

Products 1 and 2 were tested as follows:

The ISO brightness was measured and the particle size distribution was measured using a SEDIGRAPH 5100 machine. The results which were obtained are as shown in Table 1 as follows.

TABLE 1

PHYSICAL PROPERTIES

|  | Product 1 (comparative) | Product 2 |
|---|---|---|
| Brightness, ISO | 82.2 | 83.4 |
| PSD |  |  |
| % <10 microns | 100 | 100 |
| % <5 microns | 100 | 100 |
| % <2 microns | 97 | 99 |
| % <1 micron | 88 | 92 |
| % <0.5 micron | 53 | 64 |
| % <0.25 micron | 12 | 24 |

These results show that a better brightness and finer particle size distribution are obtainable using a method embodying the invention which is simpler and cheaper to run than that described in EP798268-A1.

Products 1 and 2 were evaluated in 48 gsm newsprint to compare their performance as fillers.

Handsheets were made on a TAPPI sheet mold and dried on a Noble & Wood drum dryer. The sheets were then conditioned before testing. Experimental conditions for the handsheet study are given in Table 2 below.

The handsheets were tested for brightness, opacity, caliper, Gurley porosity, burst and % ash. Scattering and absorption coefficients along with bulk were calculated. The handsheets were then calendered, conditioned again and tested.

Handsheet properties are given in Table 3 below. Sheet properties were interpolated at 5% filler to give a comparison of the pigments. The results obtained are shown in Table 4 below.

TABLE 2

EXPERIMENTAL CONDITIONS OF SHEET FORMATION
The following handsheet preparation conditions
were employed to make handsheets in accordance with
TAPPI standard T205.om-88 ("Forming handsheets for
physical tests of pulp").

| Pulp: |  |
|---|---|
| 90% TMP | 10% Kraft |
| Final consistency | 0.3% solids in aqueous suspension |
| Grammage | 48 gsm |
| pH | 4.8 |
| Sheet Mold | Tappi |
| Calendering conditions | Machine calender at 38° C. |
|  | 1 nip @ 150 psi |
|  | 1 nip @ 250 psi |
|  | 1 nip @ 250 psi |

For calendering preparation, the handsheets were placed in the desiccator for 10 minutes with water to allow the moisture content of the sheets to increase to ~8%. Between each nip the sheets were placed back in the desiccator for 5 minutes and then only one set was removed at a time.

TABLE 3

UNCALENDERED HANDSHEET PROPERTIES

| | % Grammage | | ISO Brightness | Pigment | Tappi | Hunter | | | Optest | Gurley | Burst |
|---|---|---|---|---|---|---|---|---|---|---|---|
| | gsm | Ash | % | Scatter | Opacity | L | a | b | Formation | Porosity | Index |
| Product 1 | | | | | | | | | | | |
| Sample 1 | 47.0 | 2.8 | 59.3 | 2652 | 88.2 | 87.0 | −1.3 | 14.0 | 90.4 | 13.6 | 1.73 |
| Sample 2 | 46.4 | 6.0 | 61.6 | 3164 | 90.3 | 87.9 | −1.3 | 13.2 | 84.1 | 15.5 | 1.75 |
| Sample 3 | 45.7 | 8.3 | 61.6 | 2485 | 90.6 | 87.6 | −1.3 | 12.9 | 76.1 | 8.4 | 1.81 |
| Product 2 | | | | | | | | | | | |
| Sample 1 | 46.6 | 2.9 | 59.4 | 1995 | 87.5 | 87.1 | −1.3 | 14.0 | 94.1 | 12.8 | 1.82 |
| Sample 2 | 46.8 | 6.0 | 61.6 | 2414 | 89.0 | 88.0 | −1.3 | 13.4 | 88.1 | 12.1 | 1.53 |
| Sample 3 | 45.7 | 8.7 | 62.7 | 2236 | 89.6 | 88.4 | −1.3 | 13.0 | 83.9 | 11.5 | 1.49 |

TABLE 4

CALENDERED HANDSHEET PROPERTIES

| DATA | % Grammage | | ISO Brightness | Pigment | Tappi | Hunter | | | Gurley |
|---|---|---|---|---|---|---|---|---|---|
| filler | gsm | Ash | % | Scatter | Opacity | L | a | b | Porosity |
| Product 1 | | | | | | | | | |
| Sample 1 | 47.0 | 2.8 | 58.9 | 2402 | 88.3 | 86.5 | −1.2 | 13.7 | 37.1 |
| Sample 2 | 46.4 | 6.0 | 61.1 | 2731 | 90.0 | 87.4 | −1.1 | 13.0 | 35.4 |
| Sample 3 | 45.7 | 8.3 | 61.3 | 2400 | 90.7 | 87.2 | −1.1 | 12.6 | 29.4 |
| Product 2 | | | | | | | | | |
| Sample 1 | 46.6 | 2.9 | 59.3 | 1822 | 87.6 | 86.8 | −1.1 | 13.8 | 42.2 |
| Sample 2 | 46.8 | 6.0 | 61.3 | 2014 | 88.6 | 87.6 | −1.1 | 13.2 | 27.9 |
| Sample 3 | 45.7 | 8.7 | 62.3 | 2202 | 89.9 | 88.0 | −1.1 | 12.7 | 26.5 |

The results shown in Tables 3 and 4 illustrate that the product obtained by the method embodying the invention gives similar properties (which are superior in some cases) to those obtained for the product of the process described in EP798268-A1 but, as described earlier, the product of the method embodying the invention may be obtained by a less expensive de-inking sludge treatment process.

The invention claimed is:

1. A method for treating solid calcium compound-containing material derived from industrial paper plant effluent or sludge, said method comprising:
   (a) treating said solid calcium compound-containing material with an acid to cause dissolution of calcium and formation of soluble calcium salts, thereby forming a calcium ion and soluble calcium salt-containing solution in which insoluble solids are suspended;
   (b) separating the suspended insoluble solids from the calcium ion and soluble calcium salt-containing solution in (a); and
   (c) incinerating the insoluble solids obtained in (b), and wherein fibrous material in said material derived from industrial paper plant effluent or sludge is not subjected to combustion or ignition prior to (a),
   wherein said solid calcium compound-containing material comprises at least one compound chosen from calcium carbonate, calcium silicate, and calcium phosphate.

2. A method for treating solid fiber-containing and calcium compound-containing material derived from industrial paper plant effluent or sludge, said method comprising:
   (a) treating said solid fiber-containing and calcium compound-containing material with an acid to cause dissolution of calcium and formation of soluble calcium salts, thereby forming a calcium ion and soluble calcium salt-containing solution in which insoluble solids are suspended;
   (b) separating the suspended insoluble solids from the calcium ion and soluble calcium salt-containing solution in (a); and
   (c) incinerating the insoluble solids obtained in (b),
   wherein said solid calcium compound-containing material comprises at least one compound chosen from calcium carbonate, calcium silicate, and calcium phosphate.

3. A method for treating solid calcium compound-containing material derived from industrial paper plant effluent or sludge, said method comprising:
   (a) treating said solid calcium compound-containing material with an acid to cause dissolution of calcium and formation of soluble calcium salts, thereby forming a calcium ion-and soluble calcium salt containing solution in which insoluble solids are suspended;
   (b) separating the suspended insoluble solids from the calcium ion and soluble calcium salt-containing solution in (a); and
   (c) incinerating the insoluble solids obtained in (b),
   wherein said solid calcium compound-containing material comprises at least one compound chosen from calcium carbonate, calcium silicate, and calcium phosphate.

4. A method for treating solid fiber-containing and calcium compound-containing material derived from industrial paper plant effluent or sludge, the method including treating the solid fiber-containing and calcium compound-containing material with an acid to cause dissolution of calcium and formation of soluble calcium salts, thereby forming a calcium ion and soluble calcium salt-containing solution in which insoluble solids are suspended, separating the solution from the insoluble solids, and incinerating the insoluble solids,
   wherein said solid calcium compound-containing material comprises at least one compound chosen from calcium carbonate, calcium silicate, and calcium phosphate.

5. The method of any one of claims 1, 2, 3, or 4, further comprising subjecting the incinerated insoluble solids to at least one additional treatment.

6. The method of claim 5 wherein said at least one additional treatment comprises comminuting the incinerated insoluble solids.

7. The method according to claim 6, wherein said comminuting comprises attrition grinding.

8. The method according to claim 6, wherein said comminuting comprises media grinding.

9. The method according to claim 6, wherein said comminuting is accomplished in dry form.

10. The method according to claim 6, wherein said comminuting is accomplished in an aqueous suspension.

11. The method according to claim 5, wherein said at least one additional treatment is chosen from particle size classification, washing, an additional heat treatment, and the addition of at least one chemical agent.

12. The method according to claim 1, wherein the solid calcium compound-containing material comprises calcium carbonate.

13. The method according to claim 2, wherein the solid calcium compound-containing material comprises calcium carbonate.

14. The method according to claim 3, wherein the solid calcium compound-containing material comprises calcium carbonate.

15. The method according to claim 4, wherein the solid calcium compound-containing material comprises calcium carbonate.

16. A method for processing solid calcium compound-containing material derived from industrial paper plant effluent or sludge, comprising:
   (a) subjecting said solid calcium compound-containing material to at least one heat treatment process to produce a calcined material, wherein said material derived from industrial paper plant effluent or sludge has previously undergone treatment to remove calcium, said treatment comprising treating said solid calcium compound containing material derived from industrial paper plant effluent or sludge with an acid to cause dissolution of calcium and formation of soluble calcium salts, thereby forming a calcium ion and soluble calcium salt-containing solution in which insoluble solids are suspended,
   wherein said solid calcium compound-containing material comprises at least one compound chosen from calcium carbonate, calcium silicate, and calcium phosphate.

17. The method of claim 16,
   further comprising separating the suspended insoluble solids from the calcium ion and soluble calcium salt-containing solution.

18. The method of claim 16, wherein said calcined material comprises kaolin.

19. The method according to claim 16, wherein the solid calcium compound-containing material comprises calcium carbonate.

20. A method for treating solid calcium compound-containing material derived from industrial paper plant effluent or sludge, said method comprising:
   (a) treating said solid calcium compound-containing material with an acid to cause dissolution of calcium and formation of soluble calcium salts, thereby forming a calcium ion and soluble calcium salt-containing solution in which insoluble solids are suspended;
   (b) separating said suspended insoluble solids from said calcium ion and soluble calcium salt-containing solution in (a), wherein said separated insoluble solids are capable of being subjected to at least one heat treatment process to incinerate the combustible organic compounds and calcine remaining material,
   wherein said solid calcium compound-containing material comprises at least one compound chosen from calcium carbonate, calcium silicate, and calcium phosphate.

21. The method according to claim 20, wherein the solid calcium compound-containing material comprises calcium carbonate.

22. A method for treating solid calcium compound-containing material derived from industrial paper plant effluent or sludge, comprising:
   (a) obtaining industrial paper plant effluent or sludge that has been treated with an acid to cause dissolution of calcium and formation of soluble calcium salts, thereby forming a calcium ion and soluble calcium salt-containing solution in which insoluble solids are suspended;
   (b) separating said suspended insoluble solids from said calcium ion and soluble calcium salt-containing solution;
   (c) subjecting said separated insoluble solids to at least one heat treatment process to dry the solids and incinerate combustible organic compounds; and
   (d) subjecting said dried insoluble solids to at least one heat treatment process to calcine remaining material,
   wherein said solid calcium compound-containing material comprises at least one compound chosen from calcium carbonate, calcium silicate, and calcium phosphate.

23. The method according to claim 22, wherein the solid calcium compound-containing material comprises calcium carbonate.

24. A method for treating solid calcium compound-containing material derived from industrial paper plant effluent or sludge, comprising:
   (a) obtaining a composition comprising kaolin and combustible organic compounds, wherein said composition has been attained by treating a solid calcium compound-containing material derived from industrial paper plant effluent or sludge to remove calcium;
   wherein said calcium has been removed from said solid calcium compound-containing material derived from industrial paper plant effluent or sludge with a composition comprising at least one acid to cause dissolution of calcium and formation of soluble calcium salts; and
   (b) subjecting said composition to at least one heat treatment process to incinerate said combustible organic compounds and calcine the remaining material,
   wherein said solid calcium compound-containing material comprises at least one compound chosen from calcium carbonate, calcium silicate, and calcium phosphate.

25. The method according to claim 24, wherein said at least one acid is a dilute acid.

26. The method according to claim 24, wherein said at least one acid is a mineral acid.

27. The method according to claim 26, wherein said mineral acid is hydrochloric acid.

28. The method according to claim 24, wherein said composition is subjected to at least one washing process prior to being subjected to said at least one heat treatment process.

29. The method according to claim 24, wherein said at least one heat treatment process is performed in an incineration device.

30. The method according to claim 29, wherein said incineration device is a fluidized bed furnace.

31. The method according to claim 24, wherein said at least one heat treatment process is performed at a temperature ranging from 800° C. to 1200° C.

32. The method according to claim 31, wherein said at least one heat treatment process is performed at a temperature ranging from 950° C. to 1050° C.

33. The method according to claim 24, wherein said calcined material is provided to a paper mill.

34. The method according to claim 33, wherein said calcined material is provided to a paper mill in a dry form.

35. The method according to claim 33, wherein said calcined material is provided to a paper mill in an aqueous slurry form.

36. The method of any one of claims 24, 16, or 22, further comprising subjecting the calcined material to at least one additional treatment.

37. The method of claim 36, wherein said at least one additional treatment comprises comminuting the calcined material.

38. The method according to claim 37, wherein said comminuting comprises attrition grinding.

39. The method according to claim 37, wherein said comminuting comprises media grinding.

40. The method according to claim 37, wherein said comminuting is accomplished in dry form.

41. The method according to claim 37, wherein said comminuting is accomplished in an aqueous suspension.

42. The method according to claim 36, wherein said at least one additional treatment is chosen from particle size classification, washing, an additional heat treatment, and the addition of at least one chemical agent.

43. The method according to claim 42, wherein said at least one chemical agent is chosen from optical brightening agents and coagulants.

44. The method according to claim 42, wherein the at least one additional treatment comprises an additional heat treatment, and wherein the additional heat treatment dries the solids and incinerates combustible organic compounds.

45. The method according to claim 24, wherein the solid calcium compound-containing material comprises calcium carbonate.

* * * * *